United States Patent [19]
Eckhardt

[11] Patent Number: 5,803,568
[45] Date of Patent: Sep. 8, 1998

[54] DUAL GROOVED FRESNEL LENS FOR OVERHEAD PROJECTION

[75] Inventor: Stephen K. Eckhardt, Austin, Tex.

[73] Assignee: Minnesota Mining and Manufacturing Company, St. Paul, Minn.

[21] Appl. No.: 696,982

[22] PCT Filed: Feb. 16, 1995

[86] PCT No.: PCT/US95/01796
    § 371 Date: Aug. 1, 1996
    § 102(e) Date: Aug. 1, 1996

[87] PCT Pub. No.: WO95/22772
    PCT Pub. Date: Aug. 24, 1995

[51] Int. Cl.⁶ .......................... G03B 21/14; G03B 21/132
[52] U.S. Cl. .............................. 353/102; 353/38; 353/121
[58] Field of Search ..................... 353/38, 102, 121; 359/742

[56] References Cited

U.S. PATENT DOCUMENTS

| | | | |
|---|---|---|---|
| 4,741,613 | 5/1988 | Vanderwerf | 353/102 |
| 4,900,129 | 2/1990 | Vanderwerf | 359/742 |
| 5,296,882 | 3/1994 | Nelson et al. | 353/38 |
| 5,317,349 | 5/1994 | Vanderwerf | 353/38 |
| 5,504,544 | 4/1996 | Dreyer et al. | 353/38 |

*Primary Examiner*—William Dowling
*Attorney, Agent, or Firm*—Néstor F. Ho; Jack V. Musgrove

[57] ABSTRACT

A Fresnel lens is optimized for an overhead projector by increasing its transmission efficiency through a balancing of loses due to riser blockage and surface reflection and by introducing coma in the Fresnel lens which reduces the size of the projected image of the light source filament.

13 Claims, 3 Drawing Sheets

DUAL GROOVED FRESNEL LENS FOR OVERHEAD PROJECTION

FIELD OF THE INVENTION

The present invention relates generally to Fresnel lenses, and particularly to Fresnel lenses for overhead projectors.

BACKGROUND OF THE INVENTION

Conventional Fresnel lenses for use as condensers, concentrators and field lenses are usually of the form of a single element with prismatic, circular grooves on one side and a planar surface on the other. When high transmission is required at a smaller F/number, for example in overhead projectors, two lenses of this type are sealed together, grooves adjacent, at the periphery. Since these lenses usually lie close to the imaging plane or stage of the projector, Moire patterns can appear on the projected image when the centers of the circular groove structures are not coincident to a certain tolerance.

A single element Fresnel lens with identical groove structures on both sides is described in Japanese Patent 57-109618. In that patent, two identical dies are accurately aligned in a fixture using guide posts. The lens is formed by pouring a thermoplastic resin between the dies and subsequently applying heat and pressure. Such a single element lens is economically advantageous over the conventional two lens arrangement because only one sheet of lens material is necessary. Unfortunately, the requirement that the center of the grooved surfaces be aligned to a close tolerance increases the expense of a workable single element lens, and therefore somewhat offsets its advantages.

U.S. Pat. No. 4,900,129 improves on the aforementioned Japanese patent by increasing the groove frequency of one surface of the single element Fresnel lens with respect to the other. This reduces the contrast of the Moire pattern to the point that it is invisible. In this design, the angle of incidence of a light ray on the first surface is equal to its angle of refraction on the second surface.

Although these two documents address the important issues of cost and Moire, they fail to address two others: transmission efficiency and filament image size. Transmission efficiency is the amount of light which exits the Fresnel lens in the preferred direction as a fraction of the incident light. It is important because higher efficiency leads to a brighter image on the screen or less energy used for a given illumination level. Filament image size is the size of the image of the illumination source produced by the Fresnel lens. It is important because the size of the filament image determines the size, and therefore cost, of the projection lens. Minimizing the filament image size can decrease the cost of a projector.

SUMMARY OF THE INVENTION

The present invention produces a single-element, dual-grooved Fresnel lens having nonidentical groove structures on each side of the lens. The groove frequencies are carefully controlled to reduce or eliminate the need for accurate alignment of the centers of the groove patterns on each side of the lens. Also, in one embodiment of the invention, the groove angles are designed to optimize light transmission through the lens by minimizing the combined losses due to riser blockage and surface reflection. In another embodiment, the groove angles are designed to reduce the size of the filament image. The techniques employed to increase the transmission efficiency of light through the lens and achieve a reduction of the size of the filament image may be combined to increase the overall efficiency of the optical system used in an overhead projector.

BRIEF DESCRIPTION OF THE DRAWINGS

The present invention will be described with respect to the accompanying drawings, wherein like numbers refer to like parts in the several views, and wherein.

DETAILED DESCRIPTION OF THE INVENTION

Two important criteria in judging the performance of Fresnel lenses are transmission efficiency and filament image size. Optimizing the Fresnel lens design with respect to these two criteria increases its performance in an overhead projector. Both criteria are affected by the optical design of the Fresnel lens.

Transmission efficiency is affected by two factors in the design. These are riser blockage and surface reflection. Manufacturing concerns, such as the proper formation of the ridges of the grooves, will not be considered here. Nor will potential loss factors related to material properties, such as absorption within the plastic. Such factors are not related to the design of the lens itself.

Riser Blockage

Figure 1:
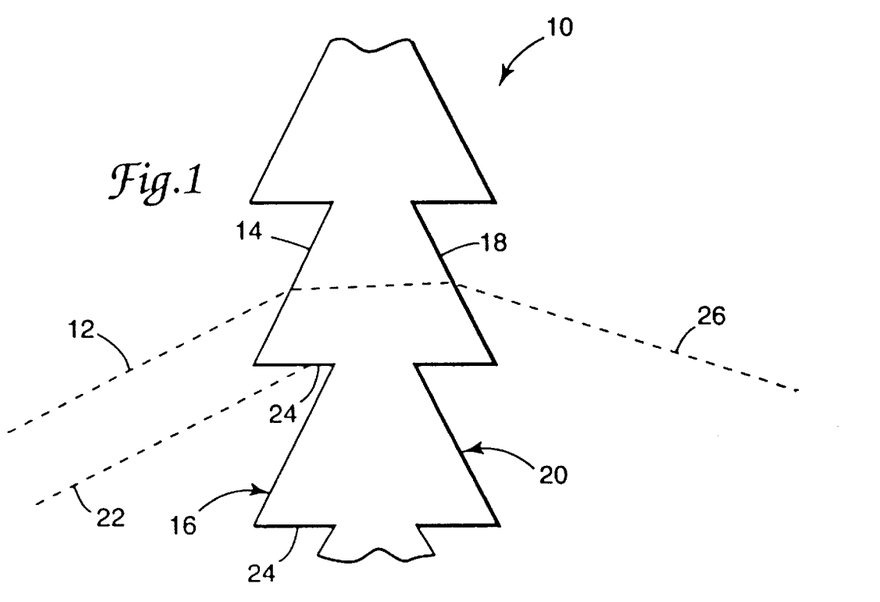
FIG. 1 is an enlarged, partial cross-sectional view of a single-element, dual-grooved Fresnel lens of the type designed according to the present invention.

"Riser blockage" is the spurious refraction, absorption or scattering of light by the "risers" of the Fresnel lens. FIG. 1 will help to explain this phenomenon. It illustrates a cross-section of a small portion of a single-element, dual-grooved Fresnel lens, generally indicated as 10. This portion of the lens 10 represents a section taken from the side of the lens 10 in FIG. 3 to the left of the optical axis.

A ray of light 12 from the filament of a light source (not shown in FIG. 1) is refracted by a facet or groove 14 of the first surface 16 of the lens 10, passes through the lens 10, is refracted by a facet or groove 18 on the second surface 20 of the lens 10 and progresses outward to form an image of the filament. This is the desired path for the light. In the case of riser blockage, a ray of light 22 intersects the Fresnel lens 10 not at a groove, but at a riser 24. The risers 24 may be fabricated such that they will refract, scatter, or absorb the ray. If they refract or scatter it, it will probably pass through the Fresnel lens 10 and leave the lens 10 at an undesirable angle. In the case of an overhead projector, light from such rays is known as stage glare. It is undesirable because it does not contribute to the brightness of the projected image, enters the eyes of the user or audience, reduces contrast on the screen or produces other objectionable effects.

Riser blockage occurs almost exclusively on the first surface 16 of the Fresnel lens 10 (the surface first contacted by light from the light source). This is because the light rays 12 are rapidly diverging as they enter the Fresnel lens 10, while the light rays are more nearly collimated (parallel) in their passage through the lens 10. The more rapidly the light rays 12 diverge, the greater the projected area of the risers 24, and hence the greater the riser blockage. Riser blockage becomes a worse problem as the focal length of a Fresnel lens decreases (for equal diameter lenses) because shorter focal lengths imply greater beam divergence.

It is possible to calculate the effect of riser blockage using simple geometry. The angle between a ray and the optical axis, $u_1$, is defined by the equation:

$$u_1 = \arctan\left(\frac{y}{d}\right) \quad (1)$$

wherein y is the distance from the optical axis of the Fresnel lens 10 to the point of intersection of a given light ray 12 and d is the distance from the light source to the Fresnel lens 10.

Figure 2:
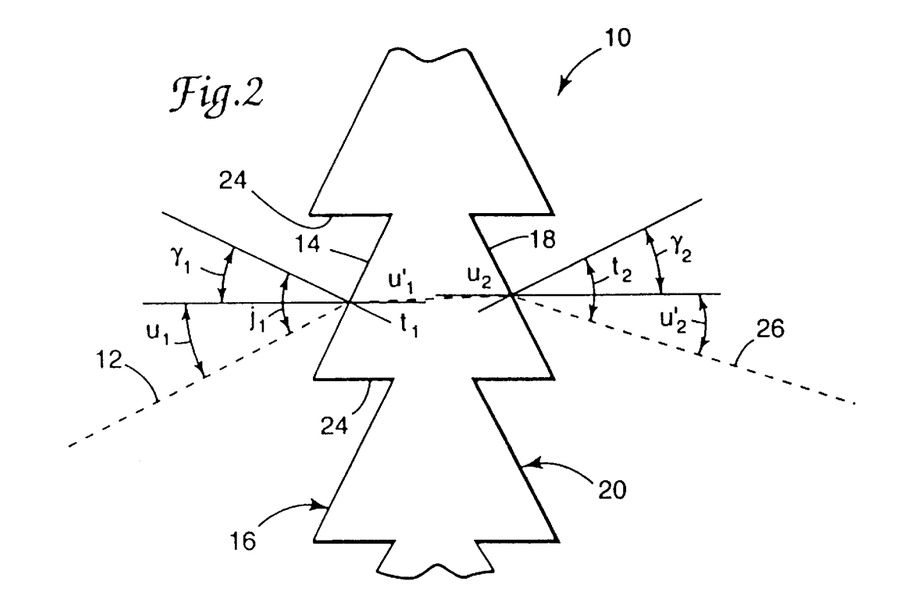
FIG. 2 is a view similar to that of FIG. 1 illustrating the parameters for calculating riser blockage of a Fresnel lens.

The groove angle, $\gamma$, is defined by the equation:

$$\gamma(y) = \arctan\left[\frac{cy}{\sqrt{1-(1+k)c^2y^2}} + 6A_6y^5 + 8A_8y^7 + 10A_{10}y^9\right] \quad (2)$$

wherein c, k, $A_6$, $A_8$ and $A_{10}$ are the parameters of the lens 10 used in its design. Additional terms of the general aspheric expansion may also be used if desired. From the geometry shown in FIG. 2, it can be shown that:

$$x = h(\cot(\gamma_1) - \tan(u_1))\cos(u_1) \quad (3)$$

wherein x is the width of the portion of the light ray 12 which is refracted by the groove 14 and h is the height of the groove 14. Similarly, L, the width of one groove is:

$$L = h(\cot(\gamma_1) + \tan(\rho)) \quad (4)$$

wherein $\rho$ is the angle of the riser 24 with respect to a normal to the plane of the lens 10. The transmission of this groove 14 is then:

$$T_{riser} = \frac{x}{L\cos(u_1)} = \frac{\cos(\gamma_1 + u_1')\cos(\rho)}{\cos(\gamma_1 - \rho)\cos(u_1)} \quad (5)$$

This equation would give the transmission of the Fresnel lens 10 at a given distance, y, from the optical axis of the lens 10 in the absence of surface reflection, assuming that the riser blockage of the second surface 20 is negligible, as is normally the case. Note that riser blockage is only a function of the Fresnel lens 10 design, which specifies $\gamma$ and $\rho$, and the light ray angle. The riser angle is often not available as a design parameter for the lens 10, because of manufacturing considerations. Therefore, riser blockage may be considered a function of $\gamma$ alone for a given distance of a light ray from the center of the lens 10. Once the riser blockage is known as a function of the distance from the axis, it is possible to optimize the Fresnel lens 10 to minimize it. However, simply minimizing the riser blockage is not sufficient to maximize transmission efficiency. It is also necessary to take surface reflection into account.

Surface Reflection

Surface reflection is an inherent problem for lenses of all types. Augustin Fresnel, who invented Fresnel lenses, also derived equations that relate the amount of light reflected by the lens surfaces to the angle of incidence. They can be calculated by the Fresnel formulae (M. Born and E. Wolf *Principles of Optics* Fifth Edition, section 1.5.2). For the two polarizations they may be expressed in terms of the incident angle, $\theta_1$, and the refractive index, n, of the Fresnel lens 10 as:

$$T_{s1}(\theta_1) = \frac{\sqrt{n^2 - \sin^2(\theta_1)}}{\cos(\theta_1)}\left(\frac{2\cos(\theta_1)}{\cos(\theta_1) + \sqrt{n^2 - \sin^2(\theta_1)}}\right)^2 \quad (6)$$

and $$T_{p1}(\theta_1) = \frac{\sqrt{n^2 - \sin^2(\theta_1)}}{\cos(\theta_1)}\left(\frac{2n\cos(\theta_1)}{n^2\cos(\theta_1) + \sqrt{n^2 - \sin^2(\theta_1)}}\right)^2 \quad (7)$$

where the angle of incidence is:

$$\theta_1 = u_1 + \gamma_1 \quad (8)$$

A Fresnel lens 10 is often used with unpolarized light, so the s and p transmission coefficients can be averaged. It is important to note that the surface reflection is a function of $\gamma_1$ alone for a given distance from the axis.

The Fresnel formulae show that the amount of surface reflection increases rapidly as the angle of incidence on the lens surface increases. This angle of incidence increases with beam divergence, so again the problem is exacerbated as focal length decreases.

Although the riser blockage on the second surface 20 of the Fresnel lens 10 can often be ignored, it is necessary to consider the second surface 20 when calculating the effect of surface reflection on light transmission. Because the light is passing from a more dense optical medium to a less dense one, the Fresnel formulae are slightly different for the second surface 20. Again, they may be formulated in terms of the angle of incidence and the refractive index:

$$T_{s2}(\theta_2) = \frac{\sqrt{1 - n^2\sin^2(\theta_2)}}{n\cos(\theta_2)}\left(\frac{2n\cos(\theta_2)}{n\cos(\theta_2) + \sqrt{1 - n^2\sin^2(\theta_2)}}\right)^2 \quad (9)$$

and $$T_{p1}(\theta_2) = \frac{\sqrt{1 - n^2\sin^2\theta_2}}{n\cos(\theta_2)}\left(\frac{2n\cos(\theta_2)}{\cos(\theta_2) + n\sqrt{1 - n^2\sin^2(\theta_2)}}\right)^2 \quad (10)$$

where $\theta_2$ refers to the angle of incidence on the second surface 20.

Minimizing the power on the first surface 16 of the Fresnel lens 10 is the only way to minimize the riser blockage. In fact, if the power on the first surface 16 were zero, there would be no riser blockage. Unfortunately, this would require that the second surface 20 have all of the power, which would cause it to lose a large amount of light to surface reflection. Therefore it is necessary to balance the power between the two surfaces to maximize the transmission efficiency.

To accomplish this maximization, it is only necessary to calculate the groove angles for the two surfaces which refract the incoming ray 12 toward the desired image of the filament. From Snell's law, it is possible to show that the angle, $u'_2$, of an exiting ray 26 is:

$$u_2' = \arcsin\left(n\sin\left(\gamma_2 - \arcsin\left(\frac{\sin(u_1 + \gamma_1)}{n}\right) + \gamma_1\right)\right) - \gamma_2 \quad (11)$$

which is a function only of the angle of the incident ray 12, the angles of the two grooves 14 and 18, and the refractive index of the material of the lens 10. The exiting ray 26 angle must be:

$$u_2' = \arctan\left(\frac{y}{d'}\right) \quad (12)$$

where d' is the distance from the Fresnel lens 10 to the desired filament image location and y is very nearly the same as, and so is considered equal to, the distance from the axis as was used to calculate u. Thus, the only unknowns in the equation are the groove angles, for a given distance from the axis to the groove 14 or 18.

The three transmission efficiency factors (riser blockage, surface reflection from the first surface 16 and surface reflection from the second surface 20) can be multiplied to obtain the total transmission as a function of the distance from the optical axis. This gives two equations for the two groove angles. It is then possible to pick an angle for a groove in the first surface 16, use the equation derived from Snell's law to calculate the groove angle in the second surface 20 and then calculate the transmission for these two groove angles. By repeating this procedure for several values for the first surface 16 groove angle, it is possible to find the value which maximizes transmission, either graphically or by computer optimization.

Filament Image Size

Filament image size is the second important design criterion for the Fresnel lens 10. It is important since it allows a reduction in the cost of an overhead projector, or, conversely, increased performance at a given price level. Control of coma induced by the Fresnel lens 10 can be used to minimize the size of the filament image. It should be noted that while the description above relating to optimization of transmission efficiency pertains only to Fresnel lenses of the single-element, dual-grooved type, the present discussion relating to minimization of filament image size is equally applicable to single-element, dual-groove type lenses and double-element, single-groove Fresnel lenses.

Figure 3:
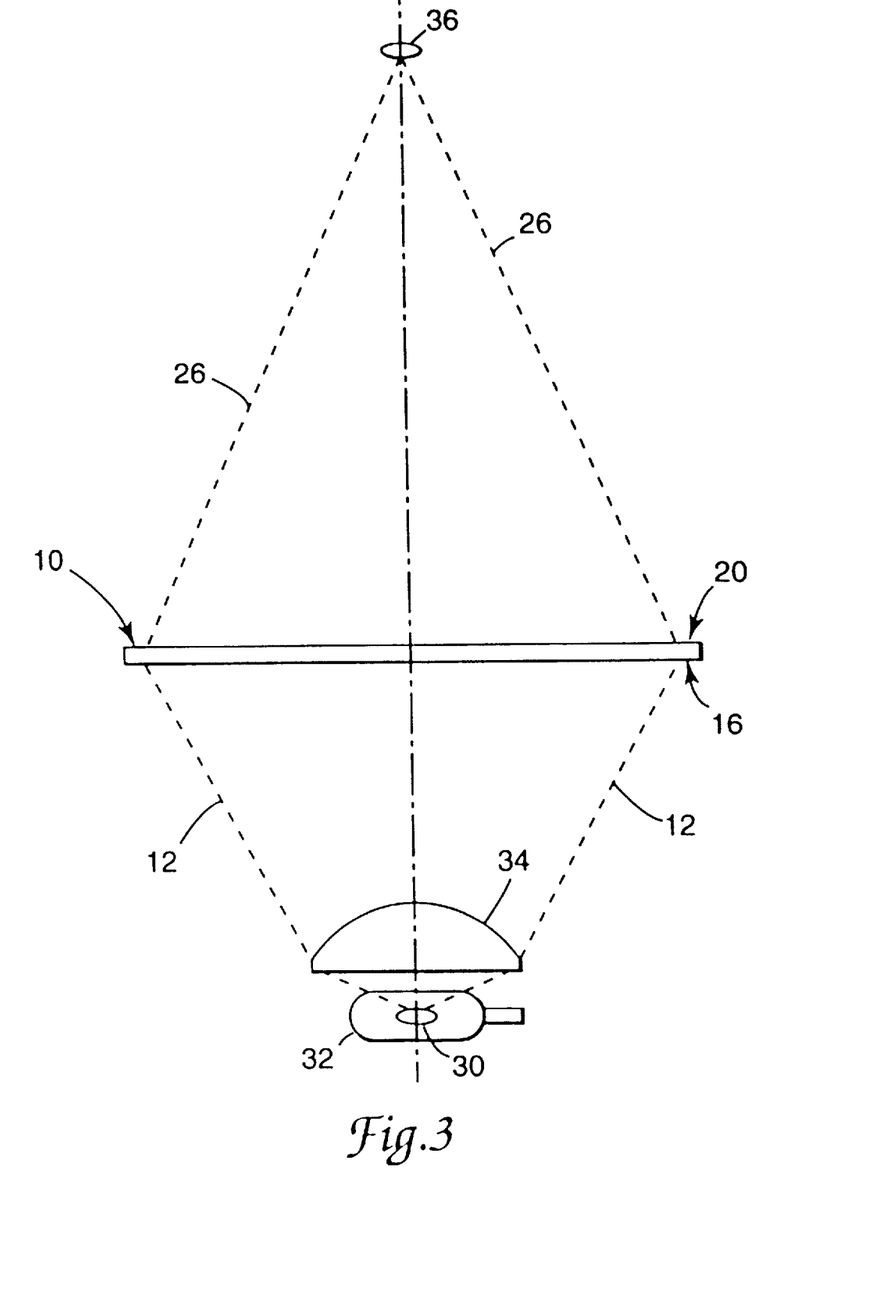
FIG. 3 is a schematic view of a portion of the optical elements of an overhead projector illustrating the formation of a filament image by a Fresnel lens.

FIG. 3 represents the formation of a filament image by a Fresnel lens 10. Light from the a filament 30 of a lamp passes through the bulb 32, possibly through a condenser 34, and thence to the Fresnel lens 10 where it is refracted to form an image 36 of the filament 30. By nature, the Fresnel lens 10 introduces aberrations into the beam of light. Specifically, axial chromatic aberration, spherical aberration and coma, along with smaller amounts of other aberrations, are introduced by the Fresnel 10. Thus, the image 36 of the lamp filament 30 is not sharp, as one would like, but smeared through a volume in the vicinity of the desired image 36.

Figure 4:
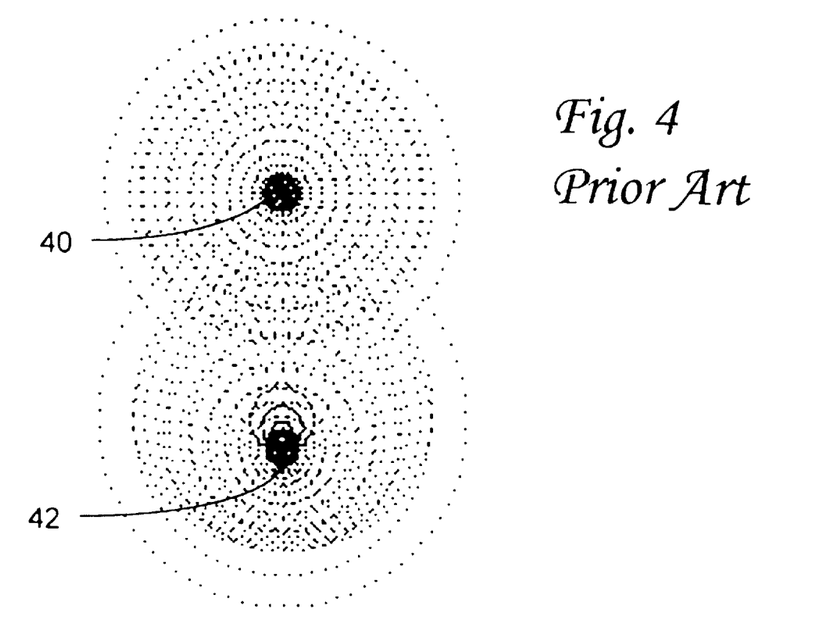
FIG. 4 is a spot diagram depicting a filament image produced according to the prior art.

The Fresnel lens described in U.S. Pat. No. 4,900,129 is an example of a design in which spherical aberration and coma are well corrected, as may be seen from FIG. 4, which is a spot diagram for the Fresnel lens described in that patent. In this spot diagram there are two distinct centers 40, 42 surrounded by roughly circular patterns. The two centers 40, 42 represent the images of two points (center 40 and corner 42) on a lamp filament 30. The circular patterns show that the main aberrations are field independent; in this case the dominant aberration is axial chromatic. Analysis shows that the spherical aberration is well corrected. The high densities of dots near the centers 40, 42 of the two patterns are the spots for green light. If spherical aberration were not well corrected, they would be much larger. Deviations from circular symmetry imply the presence of field dependent aberrations such as coma and astigmatism.

Figure 5:
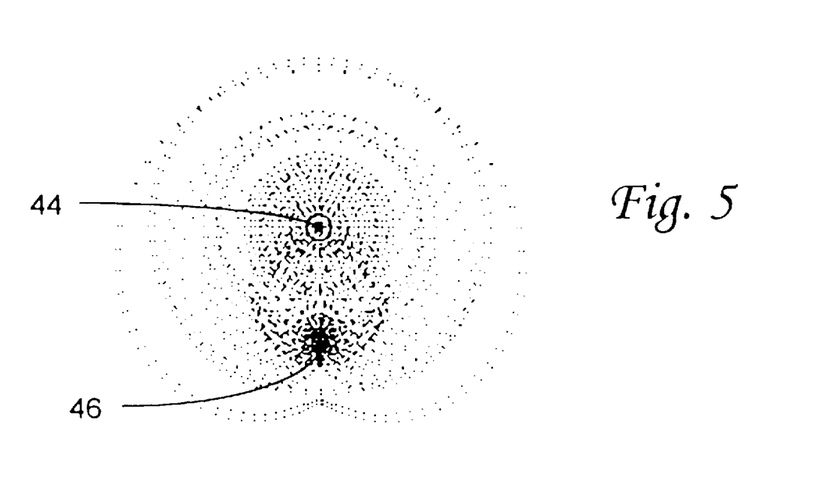
FIG. 5 is a spot diagram depicting a filament image produced according to the present invention.

FIG. 5 shows a spot diagram from a Fresnel lens 10 designed according to the current invention. The upper pattern is the image of the center 44 of the filament 30, as before. The lower pattern is the image of the corner 46 of the filament; it is noticeably distorted. This distortion is representative of the presence of coma. In the current invention, coma is intentionally introduced to reduce the size of the filament image 36. By comparing the size of spot diagrams of the filament image 36 in FIGS. 4 and 5, it will be seen that the introduction of coma has reduced the size of the image 36 by roughly one third. Such a reduction makes it possible to use a smaller, lighter and cheaper projection lens for a given range of screen sizes which may be accommodated by the overhead projector.

A useful measure for coma is a comparison of the location of the centroid of the off-axis image to its Gaussian image height. The Gaussian image height is the distance from the axis to the location of the centroid in the absence of aberration. Coma moves the location of the centroid. In the case of the prior art (FIG. 4), the centroid location has been moved only 7.3 percent of the distance from the axis to the Gaussian image point. In FIG. 5, it is apparent that the centroid is closer to the axis, in spite of the fact that the Gaussian image height for the two lenses is the same. For the specific embodiment disclosed, in order to minimize image size without regard to transmission, the distance from the optical axis to the centroid is 52 percent of the Gaussian image height for the lens. The maximum axis to centroid distance should be less than 90% of the Gaussian image height, preferably less than 75%, and most preferably less than 60%.

The simplest method for introducing coma of the correct sign to minimize the size of the filament image 36 involves the use of a lens design computer program. Several such programs are commercially available. One example is Zemax, version 2.8, which is available from Focusoft, Incorporated of Pleasanton, Calif. Lens design programs, such as Zemax, are capable of optimizing a lens 10 given a starting point and a merit function. The merit function is essentially a list of things the designer would like the lens 10 to do. It can consist of specified rays along with where they should hit certain surfaces, aberrations, other performance criteria and even physical characteristics of the lens 10. A merit function designed to reduce the size of the filament image 36 would consist of a list of rays from various points on the object (filament 30), including the center and the farthest point from the axis (the corner), which pass through sufficient points on the pupil to sample it well. Rays should be included in the red and blue portions of the spectrum as well as at the nominal operating wavelength, usually 555 nanometers for visual systems. The goal for optimization should be that each of these rays hits the image plane as close to the optical axis as possible. If the lens design program is allowed to vary the curvature, conic constant and aspheric coefficients of both surfaces of the Fresnel lens 10, it should arrive at a reasonably well optimized lens 10. However, this is a highly nonlinear problem, and the solution methods used by various programs are different, so it is unlikely that any two programs will arrive at the same solution. In addition, the solution reached will have some dependence on the starting lens 10 prescription. This is also due to the nonlinearity of the problem.

There are applications for Fresnel lenses optimized for transmission, and other applications for Fresnel lenses optimized for minimum filament image size. There are also applications in which a compromise between the two is necessary. A compromise is necessary because introduction of coma generally requires that most of the refractive power of the lens be on the bottom surface, while transmission efficiency requires that most of the power be on the upper surface of the Fresnel lens.

An example of an application requiring a compromise is an overhead projector which requires that the transmission at the edge of the Fresnel lens be greater than 50% of the center transmission. The simplest way to start the design is to start by optimizing for minimum filament image size and then check the transmission using the equations provided above. If the transmission is greater than 50% at the edge, then the design is complete. If it is not, the transmission must be increased.

One way to increase the transmission is to adjust the coefficients of the lower surface to transfer power to the upper surface, then optimize the upper surface and finally recalculate the transmission. This procedure can be iterated until the required transmission is attained. An advantage of this method is that it does optimize the filament image size for the required transmission; a disadvantage is the amount of experimentation necessary to arrive at the required transmission.

An alternative method is to specify the desired transmission at several points on the Fresnel lens, and then solve the equations to calculate the necessary groove angles. This must be done at enough points on the lens to make it possible to fit the aspheric coefficients to the groove angles. Use of this method guarantees that the desired illumination profile is obtained. The difficulty with this method is that there are two possible pairs of groove angles for any transmission other than the maximum, and there is no guarantee that the solution obtained is the one which minimizes coma.

EXAMPLE

A specific design example is now given for the dual-grooved Fresnel lens 10 for use in an overhead projector. The equation for the groove angle, γ, as a function of the distance, y, from the center of the lens 10 is:

$$\gamma(y) = \arctan\left[\frac{cy}{\sqrt{1-(1+k)c^2y^2}} + 6A_6y^5 + 8A_8y^7 + 10A_{10}y^9\right] \quad (13)$$

wherein c, k, $A_6$, $A_8$ and $A_{10}$ are design parameters.

This dual-grooved Fresnel lens 10 for use in overhead projectors has a clear aperture of 350 millimeters. The groove frequency of each surface is usually between two and fifty grooves per millimeter and the Fresnel lens 10 material is optical acrylic plastic. In order to minimize the Moire pattern, the groove frequency ratio between the two surfaces should be maintained such that one is at least four times that of the other, and is not an integral multiple thereof. The groove frequency ratio of about 4.74 recommended in U.S. Pat. No. 4,900,129 is maintained. If each surface 16, 20 has a variable groove width, then this ratio is maintained for each first and second surface groove 14, 18 pair.

The parameters for the second Fresnel lens surface 20 are:
c=8.69 E-3
k=-1.184
$A_6$=-6.23 E-13
$A_8$=8.31 E-18
$A_{10}$=0

The parameters for the first Fresnel lens surface 16 are:
c=6.87 E-3
k=-3.473
$A_6$=2.54 E-13
$A_8$=-3.80 E-18
$A_{10}$=0

There has been described a Fresnel lens which is structured, in one aspect of the invention, to maximize the transmission efficiency of light passing through the lens by minimizing the combined effects of riser blockage and surface reflection. In another aspect, the Fresnel lens may be structured to decrease the size of an image of the light source filament. Finally, the Fresnel lens may be structured to employ a compromise combination of increased transmission efficiency and reduced filament image size.

Fresnel lenses which employ only the maximized transmission efficiency teachings of the above discussion will be useful in overhead projectors if the size of the filament image is not important, i.e., if it is intended to use relatively inexpensive lenses in the projection head of the projector. If, on the other hand, it is intended to utilize relatively expensive lenses in the projection head, it will be beneficial to employ the teachings related to the means for reducing the filament size, even if this means some loss of transmission efficiency. The present invention achieves an improvement of over 5% in transmission as compared to the prior art design of U.S. Pat. No. 4,900,129, while still maintaining an optimum filament image size. If filament image size is ignored, then transmission values may be increased at least 10% and, in some cases, over 15%. For example, if the values d and d' in equations (1) and (12) are selected to be 306 mm and 430 mm, respectively, then the transmission increases by a factor of about 14%. If d and d' are selected to be 195 mm and 430 mm, respectively, then the transmission increases by a factor of about 17%. These transmission values are based on ANSI standard IT7.204-1991 (ANSI/ISO 9767-1990).

Although the present invention has been described with respect to only a limited number of embodiments, it will be apparent to those skilled in the art that many changes can be made without departing from spirit of the invention. For example, it has been attempt to describe lenses which are "perfect" in nature, i.e., lenses which perform as well as possible given the design parameters. It should be noted that Fresnel lenses having efficiencies which deviate from the idealized lenses described herein may function adequately in certain circumstances, particularly overhead projectors. Such "less than perfect" lenses can be calculated using the teachings of the present invention, simply by calculating the best lens according to the methods of the present invention and designing one that has a determined percentage less efficiency than the lenses herein described.

I claim:

1. A method of making a single-element, dual-grooved Fresnel lens having substantially identical riser angles throughout wherein the power of the two sides is balanced to achieve maximum transmission efficiency by minimizing the combined effects of riser blockage and surface reflection, the method including the steps of:

selecting a distance, d, from the Fresnel lens to a light source disposed on the optical axis of the Fresnel lens;

selecting a distance, d', from the Fresnel lens to a desired image of said light source disposed on the optical axis of the Fresnel lens;

selecting a refractive index, n, of the material of which the Fresnel lens is made;

selecting a riser angle, ρ;

determining the angle of a light ray entering the Fresnel lens, $u_1$, at a specific location a specific distance, y, from the optical axis of the Fresnel lens according to the equation:

$$u_1 = \arctan\left(\frac{y}{d}\right)$$

determining the angle of a light ray exiting the Fresnel lens, $u'_2$, at a specific location a specific distance, y, from the optical axis of the Fresnel lens according to the equation:

$$u_2' = \arctan\left(\frac{y}{d'}\right)$$

selecting a groove angle, $\gamma_1$, for the surface of the Fresnel lens closer to said light source;

determining a groove angle, $\gamma_2$, for the surface of the Fresnel lens farther from said light source from the equation:

$$u_2' = \arcsin\left(n\sin\left(\gamma_2 - \arcsin\left(\frac{\sin(u_1+\gamma_1)}{n}\right) + \gamma_1\right)\right) - \gamma_2$$

determining the transmission of the Fresnel lens which is dependant upon riser blockage, $T_{riser}$ of the Fresnel lens according to the equation:

$$T_{riser} = \frac{\cos(\gamma_1 + u_1)\cos(\rho)}{\cos(\gamma_1 - \rho)\cos(u_1)}.$$

Determining the angle of incidence, $\theta_1$, from the equation:

$$\theta_1 = u_1 + \gamma_1$$

Determining the transmission of the Fresnel lens which is dependent upon surface reflection, $T_s(\theta_1)$ and $T_p(\theta_1)$, of said surface of the Fresnel closer to said light source by averaging the two equations:

$$T_{s1}(\theta_1) = \frac{\sqrt{n^2 - \sin^2(\theta_1)}}{\cos(\theta_1)}\left(\frac{2\cos(\theta_1)}{\cos(\theta_1) + \sqrt{n^2 - \sin^2(\theta_1)}}\right)^2$$

and $$T_{p1}(\theta_1) = \frac{\sqrt{n^2 - \sin^2(\theta_1)}}{\cos(\theta_1)}\left(\frac{2n\cos(\theta_1)}{n^2\cos(\theta_1) + \sqrt{n^2 - \sin^2(\theta_1)}}\right)^2$$

Determining the angle of exitance, $\theta_2$, from the equation:

$$\theta_2 = u_2' + \gamma_2$$

Determining the transmission of the Fresnel lens which is dependent upon surface reflection, $T_s(\theta_2)$ and $T_p(\theta_2)$ of said surface of the Fresnel farther from said light source by averaging the two equations:

$$T_{s2}(\theta_2) = \frac{\sqrt{1 - n^2\sin^2(\theta_2)}}{n\cos(\theta_2)}\left(\frac{2n\cos(\theta_2)}{n\cos(\theta_2) + \sqrt{1 - n^2\sin^2(\theta_2)}}\right)^2$$

and $$T_{p1}(\theta_2) = \frac{\sqrt{1 - n^2\sin^2(\theta_2)}}{\cos(\theta_2)}\left(\frac{2n\cos(\theta_2)}{\cos(\theta_2) + n\sqrt{1 - n^2\sin^2(\theta_2)}}\right)^2$$

determining the combined transmission efficiency by multiplying the transmission of the Fresnel lens which is dependent upon riser blockage by the transmission of the Fresnel lens which is dependent upon the surface reflection of the surface of the Fresnel lens closer to said light source and multiplying the resultant product by the transmission of the Fresnel lens which is dependent upon the surface reflection of the surface of the Fresnel lens which is farther from said light source;

repeatedly calculating the combined transmission efficiency of the Fresnel lens for different values of said groove angles of the surface of the Fresnel closer to said light source until a maximum combined transmission efficiency is determined; and repeating The above steps for sufficient values of said distance from said optical axis of the Fresnel, y, until said groove angles, $\gamma$, for the entire lens have been determined.

2. A projection system comprising:
a light source;
a projection lens; and
a Fresnel lens interposed between said light source and said projection lens, said Fresnel lens having a bottom surface and a top surface, each of said surfaces having a plurality of concentric, circular grooves, defining a bottom groove angle and a top groove angle for a given entrance angle of a light ray from said light source, said groove angles being selected such that said top groove angle is greater than said bottom groove angle.

3. The projection system of claim 2 wherein said groove angles are further selected to induce coma on any off-axis light ray from said light source, said coma being directed toward an axis of said light source.

4. The projection system of claim 3 wherein said Fresnel lens produces a filament image size having a maximum axis to centroid distance of less than 90% of the Gaussian image height of said filament image.

5. The projection system of claim 4 wherein said Fresnel lens produces a filament image size having a maximum axis to centroid distance of less than 75% of the Gaussian image height of said filament image.

6. The projection system of claim 5 wherein said Fresnel lens produces a filament image size having a maximum axis to centroid distance of less than 60% of the Gaussian image height of said filament image.

7. A projection system comprising:
a light source;
a projection lens; and
a Fresnel lens interposed between said light source and said projection lens, said Fresnel lens having a bottom surface and a top surface, each of said surfaces having a plurality of concentric, circular grooves, defining a bottom groove angle and a top groove angle for a given entrance angle of a light ray from said light source, said groove angles being selected such that an angle of incidence of said light ray with said bottom surface is less than an angle of refraction of said light ray at said top surface, and said bottom groove angle is less than said top groove angle.

8. The projection system of claim 7 wherein said Fresnel lens exhibits a transmission value which is at least 5% greater than transmission through a Fresnel lens having equal angles of incidence and refraction on its first and second surfaces, respectively.

9. The projection system of claim 8 wherein said Fresnel lens exhibits a transmission value which is at least 10% greater than transmission through a Fresnel lens having equal angles of incidence and refraction on its first and second surfaces, respectively.

10. The projection system of claim 9 wherein said Fresnel lens exhibits a transmission value which is at least 15% greater than transmission through a Fresnel lens having equal angles of incidence and refraction on its first and second surfaces, respectively.

11. A projection system comprising:

a light source:

a projection lens; and a Fresnel lens interposed between said light source and said projection lens, said Fresnel lens having a bottom surface and a top surface, each of said surfaces having a plurality of concentric, circular grooves, defining a bottom groove angle and a top groove angle for a given entrance angle of a light ray from said light source, said groove angles being selected such that said bottom groove angle is less than said top groove angle, wherein said Fresnel lens produces a filament image size having a maximum axis to centroid distance of less than 90% of the Gaussian image height of said filament image.

12. A projection system comprising:

a light source;

a projection lens; and a Fresnel lens interposed between said light source and said projection lens, said Fresnel lens having a bottom surface and a top surface, each of said surfaces having a plurality of concentric, circular grooves, defining a bottom groove angle and a top groove angle for a given entrance angle of a light ray from said light source, said top groove angle being greater than said bottom groove angle, and said groove angles being selected to induce coma on any off-axis light ray from said light source, said coma being directed toward an axis of said light source and having a maximum axis to centroid distance which is less than 90% of a Gaussian image height associated with the system.

13. The projection system of claim 12 wherein said Fresnel lens exhibits a transmission value which is at least 5% greater than transmission through a Fresnel lens having equal angles of incidence and refraction on its first and second surfaces, respectively.

* * * * *

UNITED STATES PATENT AND TRADEMARK OFFICE
CERTIFICATE OF CORRECTION

PATENT NO.: 5,803,568

DATED: Sep. 8, 1998

INVENTOR(S): Stephen K. Eckhardt

It is certified that error appears in the above-identified patent and that said Letters Patent is hereby corrected as shown below:

Title Page, Col. 1, Item '[63] should read -- [63] Continuation-in-Part of Serial No. 08/197,149, February 16, 1994. abandoned July 24, 1995. --

Col. 1, after the title: Please insert as follows:

-- This is a Continuation-in-Part of Ser. No. 08/197,149, filed February 16, 1994, abandoned. --

Signed and Sealed this

Seventeenth Day of August, 1999

Attest:

Q. TODD DICKINSON

*Attesting Officer*  *Acting Commissioner of Patents and Trademarks*